No. 893,081. PATENTED JULY 14, 1908.
A. KUNAN.
NUT LOCK.
APPLICATION FILED APR. 9, 1908.

Witnesses

Inventor
A. Kunan.
By
Attorneys

UNITED STATES PATENT OFFICE.

ANDREW KUNAN, OF ROXBURY, MASSACHUSETTS.

NUT-LOCK.

No. 893,081.  Specification of Letters Patent.  Patented July 14, 1908.

Application filed April 9, 1908. Serial No. 426,092.

*To all whom it may concern:*

Be it known that I, ANDREW KUNAN, citizen of the United States, residing at Roxbury, in the county of Suffolk and State of Massachusetts, have invented certain new and useful Improvements in Nut-Locks, of which the following is a specification.

The object of this invention is an improved and ingenious nut lock which may be readily applied to a peculiarly formed bolt to effectually retain the nut in position thereon against any accidental loosening movement, and which is thus particularly adapted for use in connection with rail joints or jarring machinery, or the like.

With this and other objects in view that will more fully appear as the description proceeds, the invention consists in certain constructions and arrangements of the parts that I shall hereinafter fully describe and then point out the novel features thereof in the appended claims.

Figure 1:
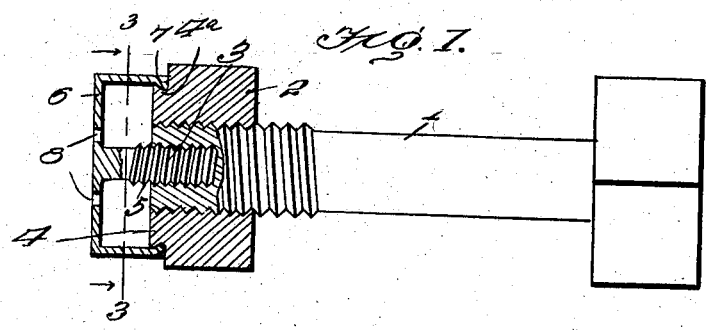
Figure 2:
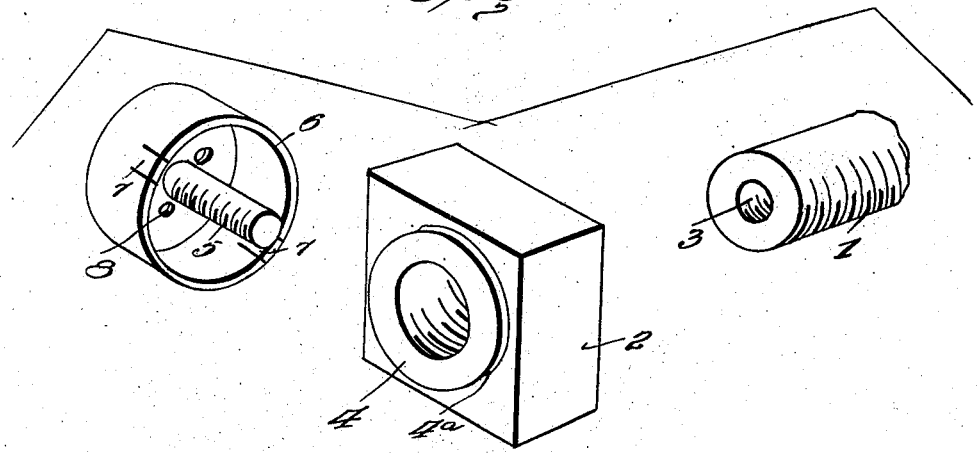
Figure 3:
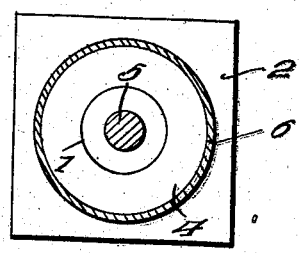

For a full understanding of the invention and the merits thereof, and to acquire a knowledge of the details of construction, reference is to be had to the following description and accompanying drawing, in which:

Figure 1 is a longitudinal section of my improved nut lock; Fig. 2 is a perspective view showing the parts in juxtaposition; and Fig. 3 is a section on the line 3—3 of Fig. 1.

Corresponding and like parts are referred to in the following description and indicated in all the views of the drawing, by the same reference characters.

Referring to the drawing, the numeral 1 designates a bolt with exterior threads, and 2 a nut working upon the bolt and arranged to be screwed up against the work, said bolt and nut being of the ordinary construction, except that the bolt is formed in its extremity with an outwardly opening socket 3, threaded oppositely to the exterior threads and the nut is formed in its outer face with a boss 4, the outer edge of which is under-cut, as indicated at 4ᵃ. A screw 5, which is threaded oppositely to the exterior threads of the bolt 1, is engaged in the threaded socket 3, with its outer end secured to or formed integral with a cylindrical cap 6. This cap is slightly larger in diameter than the boss of the nut, and is arranged to incase the extremity of the bolt, with its edge abutting against the outer face of the nut, said cap being slit in its marginal portion as shown, to form two diametrically opposite tongues 7 that are bent inwardly into engagement with the under-cut edge 4ᵃ, to anchor the nut and the cap together.

In the practical use of my improved nut lock, any jarring movement that would tend to have a loosening effect upon the nut, would obviously have an opposite effect upon the interior screw 5 and would thus cause the cap to bear against the nut, to prevent the disengagement of the latter from the bolt. The engagement of the tongues 7 with the under-cut edge 4ᵃ obviously retains the cap 6 in position during any jarring which would tend to have a loosening effect upon the interior screw. It will be noted that by the annular formation of the boss 4 with its under-cut edge, the tongues 7 of the cap 6 may be engaged therewith, to anchor the nut and the cap together, no matter what the position of the nut may be after it has been screwed up against the work.

In order to facilitate the removal of the cap, after the disengagement of the tongues from the under-cut edge 4ᵃ, the cap is preferably formed with two spaced openings 8 which are arranged to render the cap susceptible of engagement with a spanner or similar tool, so as to conveniently rotate the cap, and effect the disengagement of the interior screw from the socket.

From the above description, in connection with the accompanying drawing, it will be apparent that I have provided a simple, durable and efficient construction of nut lock, which is positive in action, which may be easily and cheaply manufactured at a cost but slightly greater than that of the ordinary nut and bolt, and which consists of comparatively few parts that may be readily assembled.

Having thus described the invention, what I claim is:

The combination with an exteriorly threaded bolt formed in its extremity with an outwardly opening threaded socket, of a nut mounted upon the bolt and formed on its outer face with an annular boss having an under-cut edge, an interior screw working in the socket, and a cap secured to the outer end of the screw and arranged to bear against the outer face of the nut, said cap being slit to form a tongue that is designed to be bent into engagement with the under-cut edge of the boss.

In testimony whereof I affix my signature in presence of two witnesses.

ANDREW KUNAN. [L. S.]

Witnesses:
GOTTFRIED JOHNSON,
JOHN RALLOCH.